(12) United States Patent
Delaney et al.

(10) Patent No.: US 10,399,688 B2
(45) Date of Patent: Sep. 3, 2019

(54) NACELLE LATCH ALIGNMENT (71) Applicant: ROHR, INC., Chula Vista, CA (US)

(72) Inventors: Mac P. Delaney, San Diego, CA (US); Kiefer Grindle, San Diego, CA (US)

(73) Assignee: ROHR, Inc., Chula Vista, CA (US)

( * ) Notice: Subject to any disclaimer, the term of this patent is extended or adjusted under 35 U.S.C. 154(b) by 504 days.

(21) Appl. No.: 15/346,933

(22) Filed: Nov. 9, 2016

(65) Prior Publication Data
US 2018/0127107 A1 May 10, 2018

(51) Int. Cl.
B64D 29/06 (2006.01)
B64D 29/08 (2006.01)
E05B 79/06 (2014.01)
E05B 85/02 (2014.01)
E05B 85/10 (2014.01)
E05B 15/00 (2006.01)

(52) U.S. Cl.
CPC ............ B64D 29/06 (2013.01); B64D 29/08 (2013.01); E05B 15/0006 (2013.01); E05B 79/06 (2013.01); E05B 85/02 (2013.01); E05B 85/103 (2013.01)

(58) Field of Classification Search
CPC ..... B64D 29/06; B64D 29/08; E05B 15/0006; E05B 79/06; E05B 85/02; E05B 85/103
See application file for complete search history.

(56) References Cited

U.S. PATENT DOCUMENTS

| 5,152,559 | A | * | 10/1992 | Henrichs | B64D 29/06 292/113 |
| 5,518,206 | A | | 5/1996 | Arnold | |
| 5,941,061 | A | * | 8/1999 | Sherry | B64D 29/08 244/54 |
| 2012/0235425 | A1 | | 9/2012 | Do | |
| 2013/0106122 | A1 | | 5/2013 | Do | |
| 2016/0280382 | A1 | * | 9/2016 | Sitson | B64D 29/08 |
| 2016/0280383 | A1 | * | 9/2016 | Lee | B64D 29/08 |

FOREIGN PATENT DOCUMENTS

WO 2014143501 9/2014

OTHER PUBLICATIONS

European Patent Office, European Search Report dated May 2, 2018 in Application No. 17200654.6-1010.

* cited by examiner

Primary Examiner — Rodney A Bonnette
(74) Attorney, Agent, or Firm — Snell & Wlmer, L.L.P.

(57) ABSTRACT

A nacelle may include fan cowl panels which may be opened to provide access to the fan case. A latching mechanism may latch a left fan cowl panel to a right fan cowl panel. As a handle is closed to unlatch the latching mechanism, an alignment feature may align the handle within the latching mechanism.

19 Claims, 9 Drawing Sheets

NACELLE LATCH ALIGNMENT

FIELD

The disclosure generally relates to turbofan propulsion systems for aircraft. More particularly, the disclosure relates to latches for a nacelle in a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a fan cowl which forms the outer portion of the nacelle in the area of the fan case. The fan cowl typically has two halves which may hinge open to provide access to the fan cowl and any components mounted on it, which sometimes includes a lube oil sump and pump, the computer for controlling the engine, etc. Similarly, nacelle thrust reversers may comprise two halves that are coupled via one or more hinges.

Latches have been used to latch the fan cowl halves and thrust reverser halves to each other, but these existing latches may suffer from various disadvantages or insufficiencies. For example, in the event that the latch is not manually engaged prior to engine operation, the fan cowl halves are not secured. The location of the latches may be obscured from quick visual inspection. Thus, it is possible for unlatched fan cowl halves to go unnoticed should the latches not be properly inspected, and an aircraft may takeoff with unlatched fan cowl halves. The fan cowl halves may separate from the nacelle during flight if the latches are not secured. Latch handles tend to be long, in part to provide an easily noticeable unlatched fan cowl. Additionally, the tolerance for gaps between the latch handle and the latch housing is small to decrease aerodynamic drag. However, even small angular tolerance is exacerbated by the length of the latch handle, which may cause the latch handle to contact the latch housing and cause damage to the housing or the handle.

SUMMARY

An aircraft nacelle may comprise a first nacelle component rotatable about a first hinge and a second nacelle component rotatable about a second hinge, wherein the first nacelle component and the second nacelle component are rotatable between a closed position in which the first nacelle component and the second nacelle component form an exterior of the aircraft nacelle, and an open position in which the first nacelle component and the second nacelle component are separated; and a latching mechanism configured to prevent the first nacelle component from separating from the second nacelle component, wherein the latching mechanism comprises: a latch housing comprising a forward wall and an aft wall; a latch handle; and a first alignment feature coupled to at least one of the latch housing or the latch handle, wherein the first alignment feature is configured to create contact between the forward wall and the latch handle and align the latch handle within the latch housing in response to the latch handle closing.

In various embodiments, a second alignment feature may be coupled to the aft wall. The latch handle may comprise a target extending from a distal end of the latch handle. The first alignment feature may comprise a guide ramp. The guide ramp may be positioned at angle of between 10°-20° relative to the forward wall. The guide ramp may be curved. The first nacelle component may comprise a first fan cowl panel, and the second nacelle component may comprise a second fan cowl panel. The first alignment feature may be configured to align the latch handle by contacting a radially inward surface of the latch handle.

A latch mechanism for a nacelle may comprise a first half of a latch housing; a second half of the latch housing comprising an external surface; and an alignment feature coupled to at least one of: the first half of the latch housing, the second half of the latch housing, or a latch handle and configured to prevent damage to the external surface from contact by the latch handle.

In various embodiments, the latch handle may be coupled to the first half of the latch housing. The alignment feature may comprise a guide ramp. The alignment feature may be configured to contact the latch handle and align the latch handle within the latch housing. The first half may be coupled to a first fan cowl panel, and the second half may be coupled to a second fan cowl panel. The alignment feature may be integrally formed with the latch housing. The guide ramp may be positioned at an angle of between 10°-20° relative to a forward wall.

A method of latching nacelle components together may comprise rotating a latch handle coupled to a first half of a latch housing, wherein the first half of the latch housing is coupled to a first nacelle component; contacting an alignment feature; and using the contact between the alignment feature and the latch handle to align the latch handle within the first half of the latch housing and a second half of the latch housing.

In various embodiments, the contacting prevents the latch handle from contacting an external surface of the second half of the latch housing. The second half of the latch housing may be coupled to a second nacelle component. The first nacelle component may be secured to the second nacelle component. The first nacelle component may comprise a fan cowl panel or a thrust reverser half.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for latching nacelle components are disclosed. Latches may be employed to close and secure fan cowl panels or thrust reverser halves together for flight. A latch is preferable to a permanent mechanical attachment of the fan cowl panels because the fan cowl panels should be removable or openable by ground support personnel in order to reach the fan case for inspection and servicing.

A latch may comprise one or more alignment features coupled to a latch housing or a latch handle, which facilitates alignment of the latch handle within the latch housing, without the latch handle contacting the latch housing and potentially causing damage.

Figure 1:
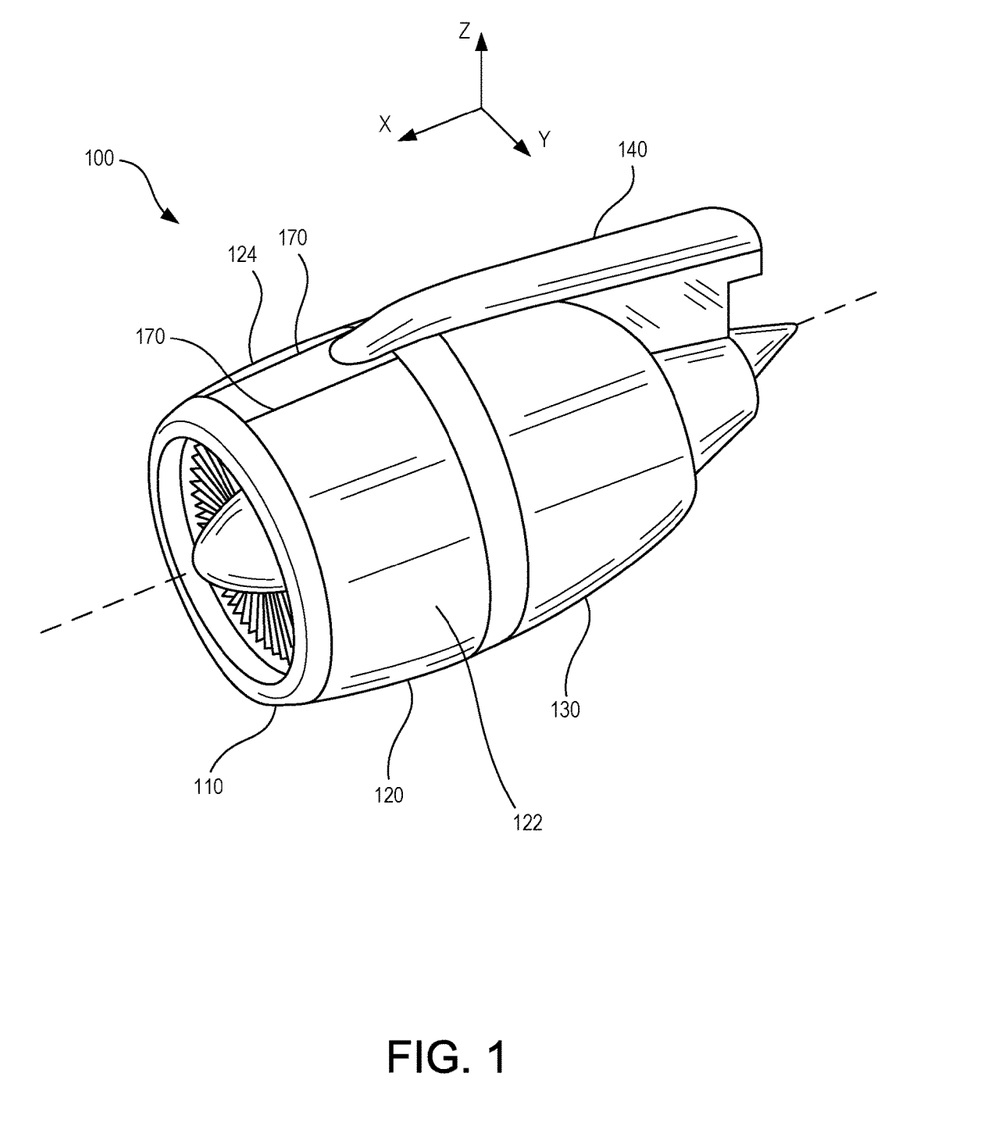
FIG. 1 illustrates a perspective view of a nacelle in accordance with various embodiments of the disclosure.

Referring to FIG. 1, a nacelle 100 for a gas turbine engine is illustrated according to various embodiments. X-y-z axes are shown for ease of illustration. As used herein, the term forward represents the positive x-direction, the term rear or aft represents the negative x-direction, the term left represents the positive y-direction, the term right represents the negative y-direction, the term down represents the negative z-direction, and the term up represents the positive z-direction. Nacelle 100 may comprise an inlet 110, a fan cowl 120, and a thrust reverser 130. Nacelle 100 may be coupled to a pylon 140, which may mount the nacelle 100 to an aircraft wing or aircraft body.

The fan cowl 120 may comprise a left fan cowl panel 122 and a right fan cowl panel 124. The left fan cowl panel 122 and the right fan cowl panel 124 may hinge open at hinges 170. The left fan cowl panel 122 and the right fan cowl panel 124 may hinge open at hinges 170 in order to provide access to the fan case for inspection or servicing. The left fan cowl panel 122 and the right fan cowl panel 124 may together form a portion of the exterior of the nacelle 100 when the left fan cowl panel 122 and the right fan cowl panel 124 are closed. The left fan cowl panel 122 and the right fan cowl panel 124 may be latched together at the bottom of the nacelle 100 where the left fan cowl panel 122 and the right fan cowl panel 124 meet.

Figure 2:
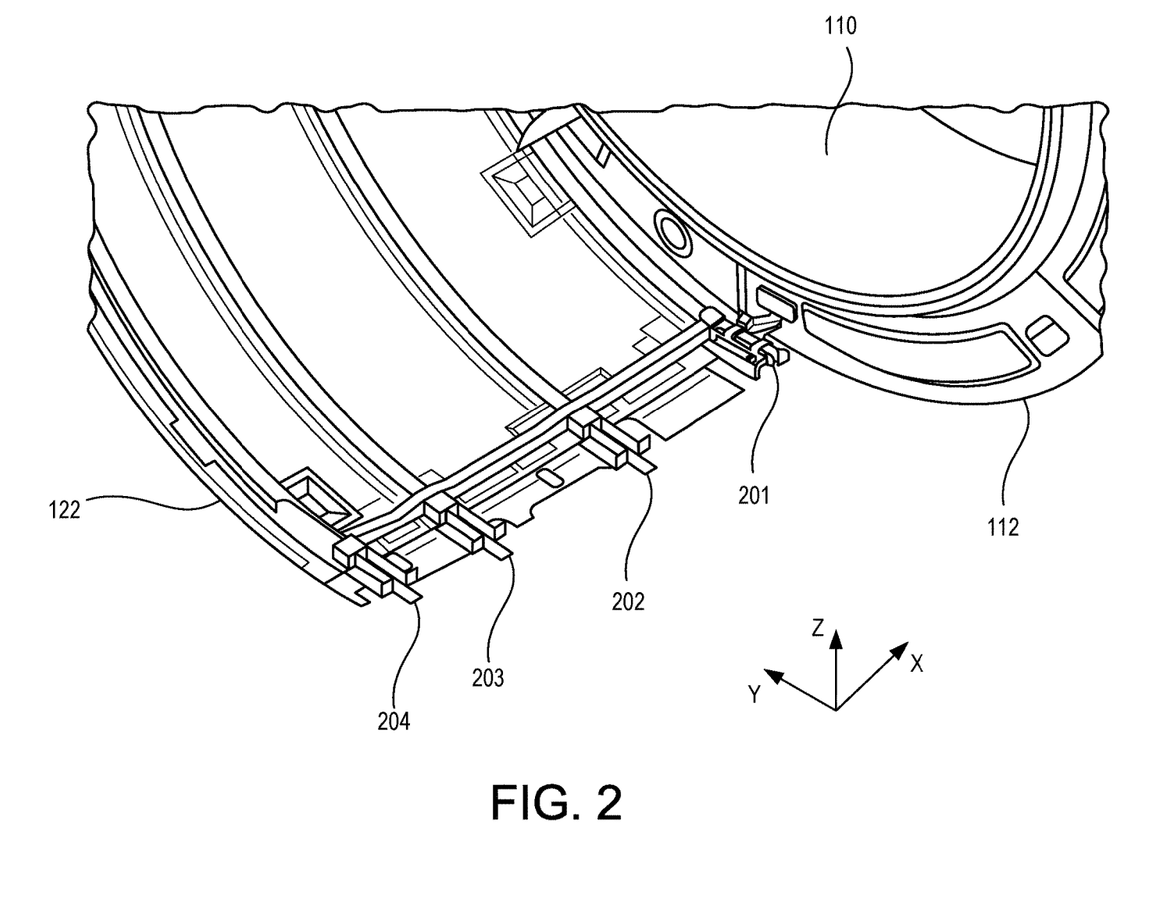
FIG. 2 illustrates an interior view of a left fan cowl panel in accordance with various embodiments of the disclosure.

Referring to FIG. 2, a perspective view of the interior of a left fan cowl panel 122 is illustrated according to various embodiments. The left fan cowl panel 122 is located aft of the inlet 110 and adjacent to an inlet aft bulkhead 112. The right fan cowl panel 124 is not shown in FIG. 2 for ease of illustration. The left fan cowl panel 122 may be coupled to the right fan cowl panel 124 by a series of latches. A number one latch 201 may be the most forward latch. A number two latch 202, a number three latch 203, and a number four latch 204 may be located aft of the number one latch 201. Nacelles may comprise any suitable number of fan cowl latches, such as one, two, three, four, or any other suitable number depending on design specifications.

Figure 3:
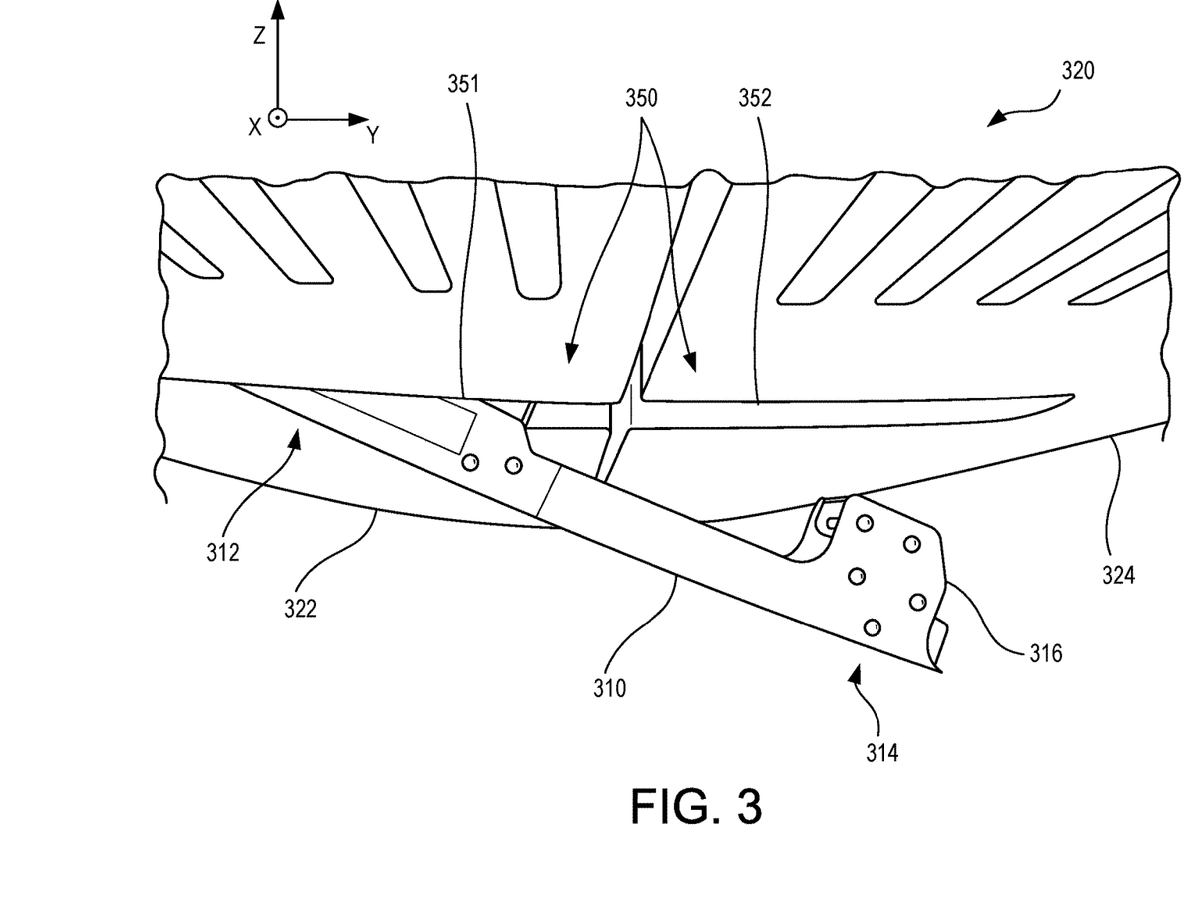
FIG. 3 illustrates a perspective view of a latch mechanism for a fan cowl in accordance with various embodiments of the disclosure.

Referring to FIG. 3, a perspective view of a partially opened latch handle 310 from the exterior of a fan cowl 320 is illustrated according to various embodiments. The latch handle 310 may be rotated in a clockwise direction in the illustration to unlatch the right fan cowl panel 322 from the left fan cowl panel 324. The latch handle 310 may be rotated in a counter-clockwise direction in the illustration to latch the right fan cowl panel 322 to the left fan cowl panel 324. The latch handle 310 may pivot about a fulcrum (obscured by the right fan cowl panel 322) in a proximal half 351 of a latch housing 350. The latch handle 310 may comprise a proximal end 312 adjacent to the fulcrum, and a distal end 314 opposite the fulcrum. The distal end 314 may comprise a target 316 extending radially inward (positive z-direction) from the latch handle 310. The target 316 may be detected by a sensor within a distal half 352 of the latch housing 350 to detect that the latch mechanism is closed. If the latch handle 310 deflects in the forward or aft direction (positive or negative x-direction) at the fulcrum, the maximum displacement will be observed at the distal end 314 of the latch handle 310. In response to the latch handle 310 being closed while the latch handle 310 is not properly aligned within the latch housing 350, the distal end 314 of the latch handle 310 may contact the latch housing 350, potentially causing damage to the latch housing 350 or the latch handle 310. However, the latch housing 350 may comprise alignment features, such as those described with reference to FIG. 4), which tend to align the latch handle 310 and tend to prevent the latch handle 310 from damaging the latch housing 350.

Figure 4:
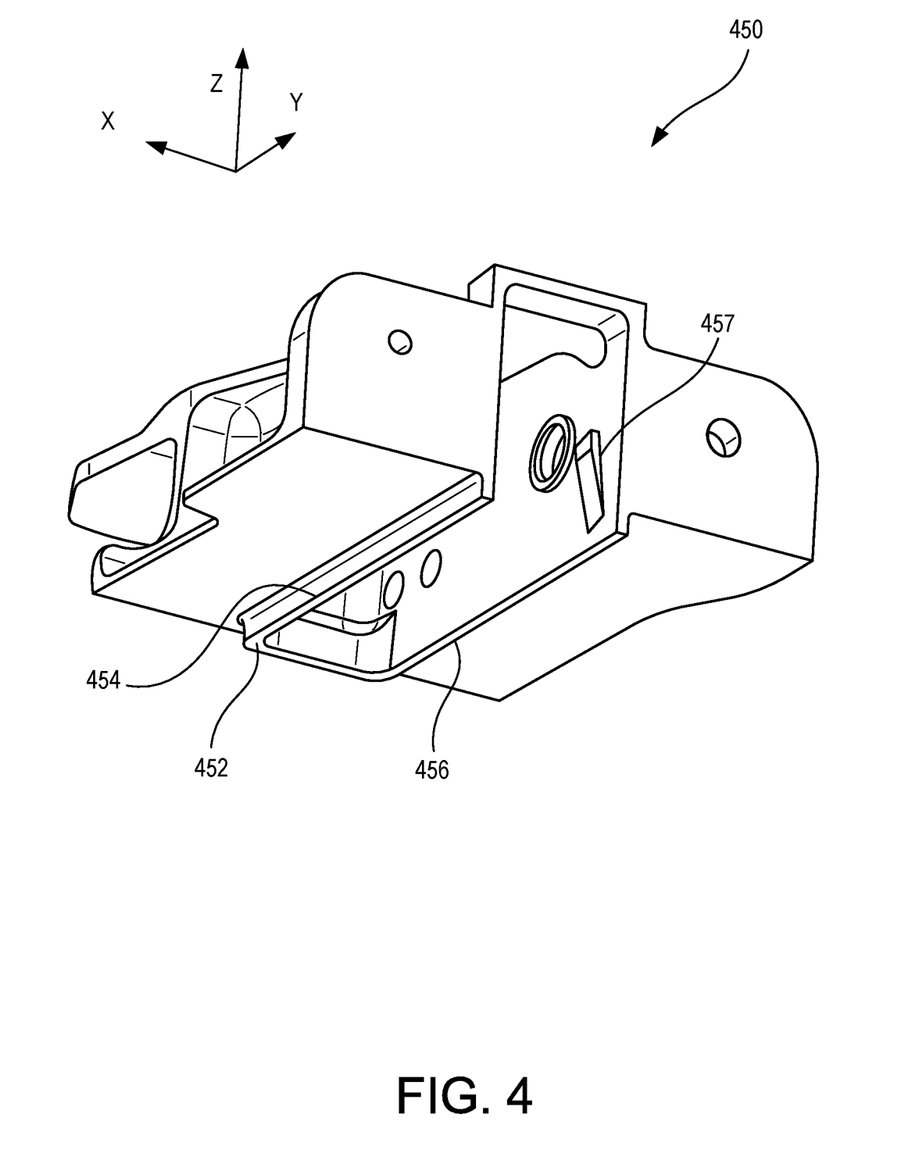
FIG. 4 illustrates a perspective view of a proximal half of a latch housing in accordance with various embodiments of the disclosure.

Referring to FIG. 4, a proximal half 450 of a latch housing is illustrated according to various embodiments. The fulcrum and the proximal end of the latch handle may be located within the proximal half 450 of the latch housing. The proximal half 450 may comprise an external surface 452, which may be flush with the external surface of the fan cowl when proximal half 450 is installed within the fan cowl. The proximal half 450 may comprise a forward wall 454 and an aft wall 456 extending radially inward (positive z-direction) from the external surface 452. The latch handle may be configured to fit between the forward wall 454 and the aft wall 456 when the latch mechanism is in the latched position. An alignment feature 457 may be coupled to the aft wall 456 of the proximal half 450. The alignment feature 457 may be configured to contact the latch handle as the latch handle is being closed and align the latch handle within the proximal half 450 and a distal half of the latch housing, such that the distal end of the latch handle does not contact an external surface of the latch housing.

Figure 5:
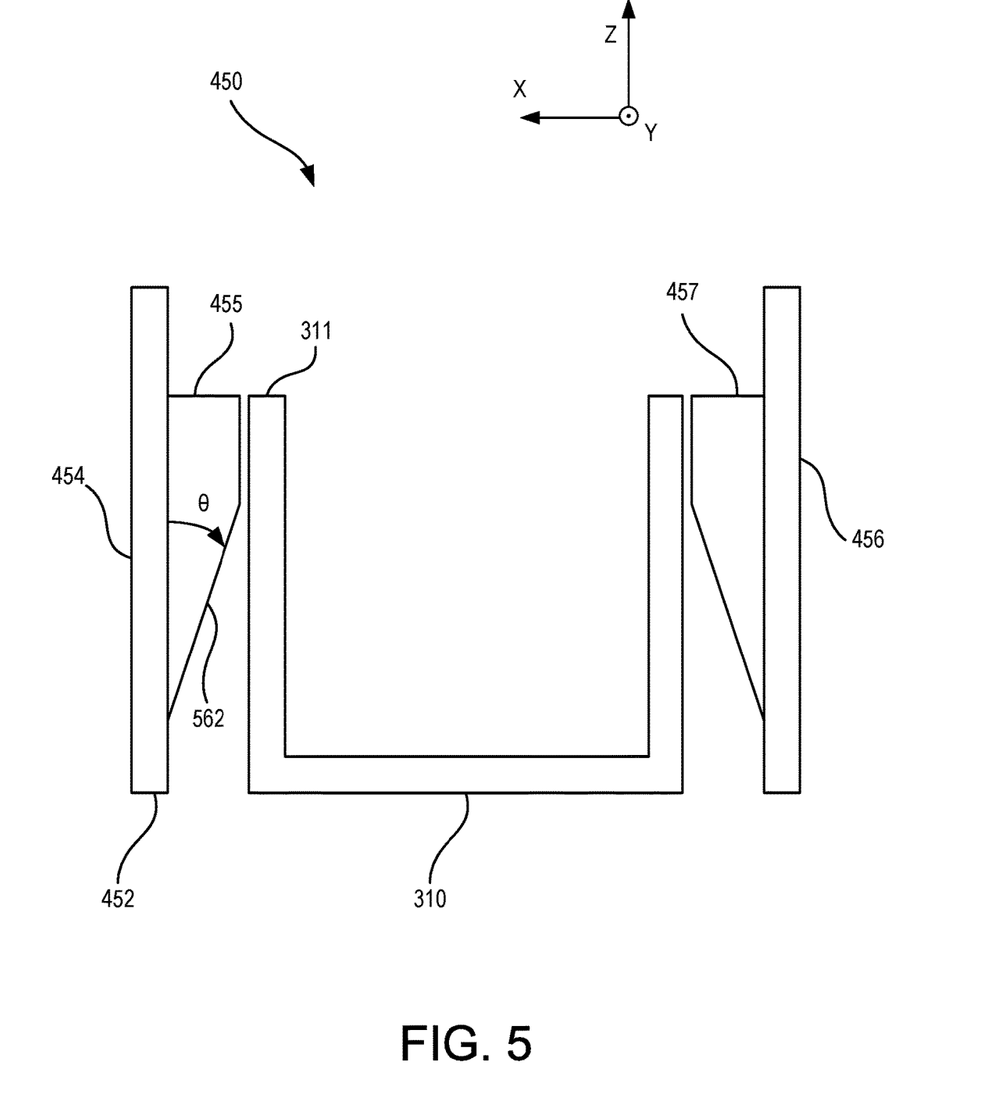
FIG. 5 illustrates a cross-section view of a latch mechanism in accordance with various embodiments of the disclosure.

Referring to FIG. 5, a cross-section view of the proximal half 450 of the latch housing taken through the alignment features 455, 457 is illustrated according to various embodiments. The latch housing may comprise a forward alignment feature 455 coupled to the forward wall 454 of the latch housing, and an aft alignment feature 457 coupled to an aft wall 456 of the latch housing. In various embodiments, the forward alignment feature 455 may comprise a guide ramp 562. The guide ramp 562 may be positioned at an angle θ relative to the forward wall 454. In various embodiments, the angle θ between the forward wall 454 and the guide ramp 562 may be between 10°-20°, or between 5°-45°. In various embodiments, the forward alignment feature 455 may be integrally formed with the proximal half 450 of the latch housing. However, in various embodiments, the forward alignment feature 455 may be welded, bonded, bolted, riveted, or coupled to the latch housing in any other suitable manner or location. In various embodiments, a dry film lubricant or other type of coating may be applied to the guide ramp 562 to decrease friction between the guide ramp 562 and the latch handle 310. In various embodiments, the aft alignment feature 457 may be a mirror image of the forward alignment feature 455, and each alignment feature 455, 457 may comprise similar shapes and features.

In various embodiments, as the latch handle 310 is closed, a radially inward surface 311 of the latch handle 310 may contact the guide ramp 562, causing the latch handle 310 to move in the forward or aft direction (positive of negative x-direction) as the latch handle 310 is closed until the latch handle 310 is centered between the alignment features 455, 457. The guide ramp 562 may prevent the latch handle 310 from contacting the external surface 452 and damaging the external surface 452.

Figure 6:
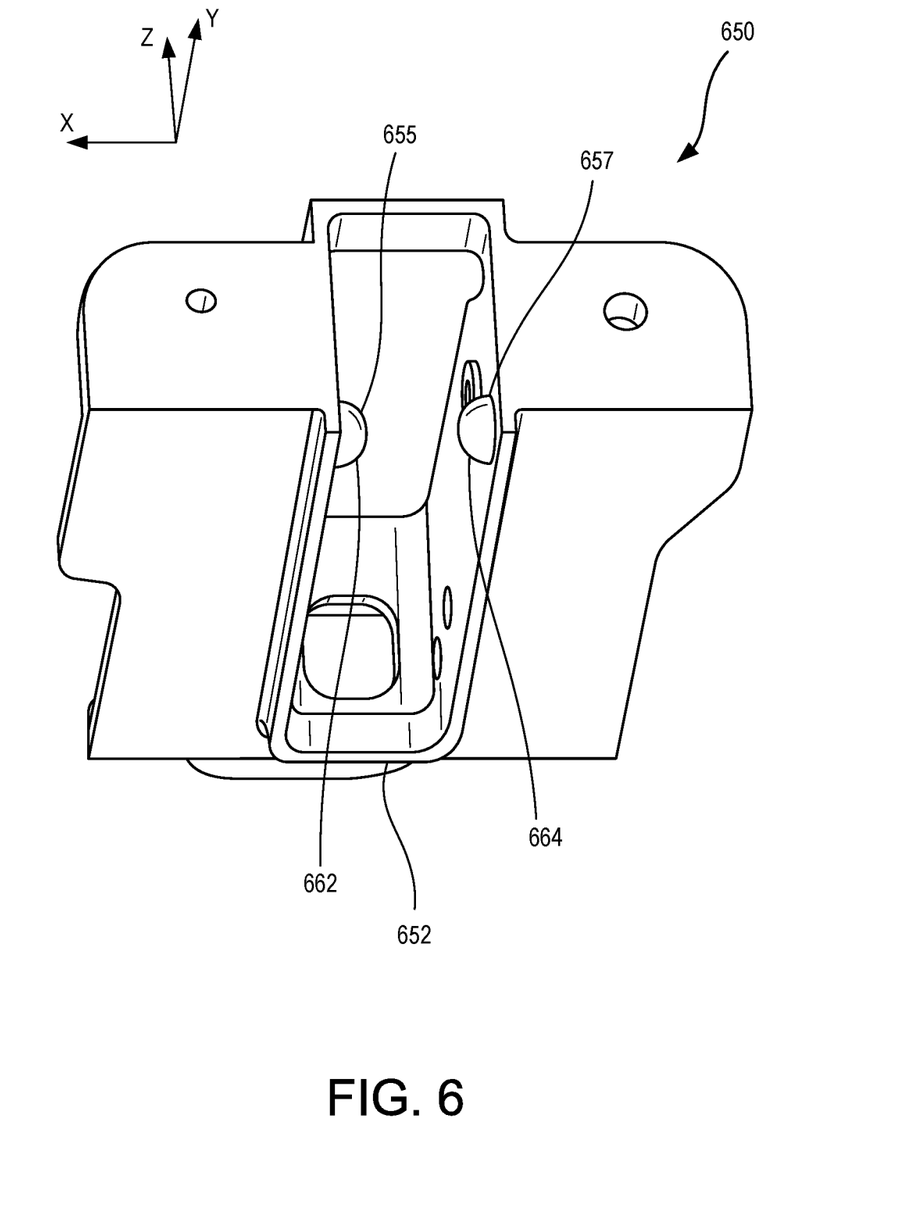
FIG. 6 illustrates a perspective view of a proximal half of a latch housing with spherical alignment features in accordance with various embodiments of the disclosure.

Referring to FIG. 6, a perspective view of the proximal half 650 of a latch housing with rounded alignment features 655, 657 is illustrated according to various embodiments. The alignment features 655, 657 may be spherical, such that the alignment features 655, 657 are portions of a sphere. In various embodiments, the alignment features 655, 657 may comprise a curved guide ramp 662, 664. A variety of shapes may be used for the alignment features 655, 657 in accordance with various embodiments, in order to prevent damage to the external surface 652.

Figure 7:
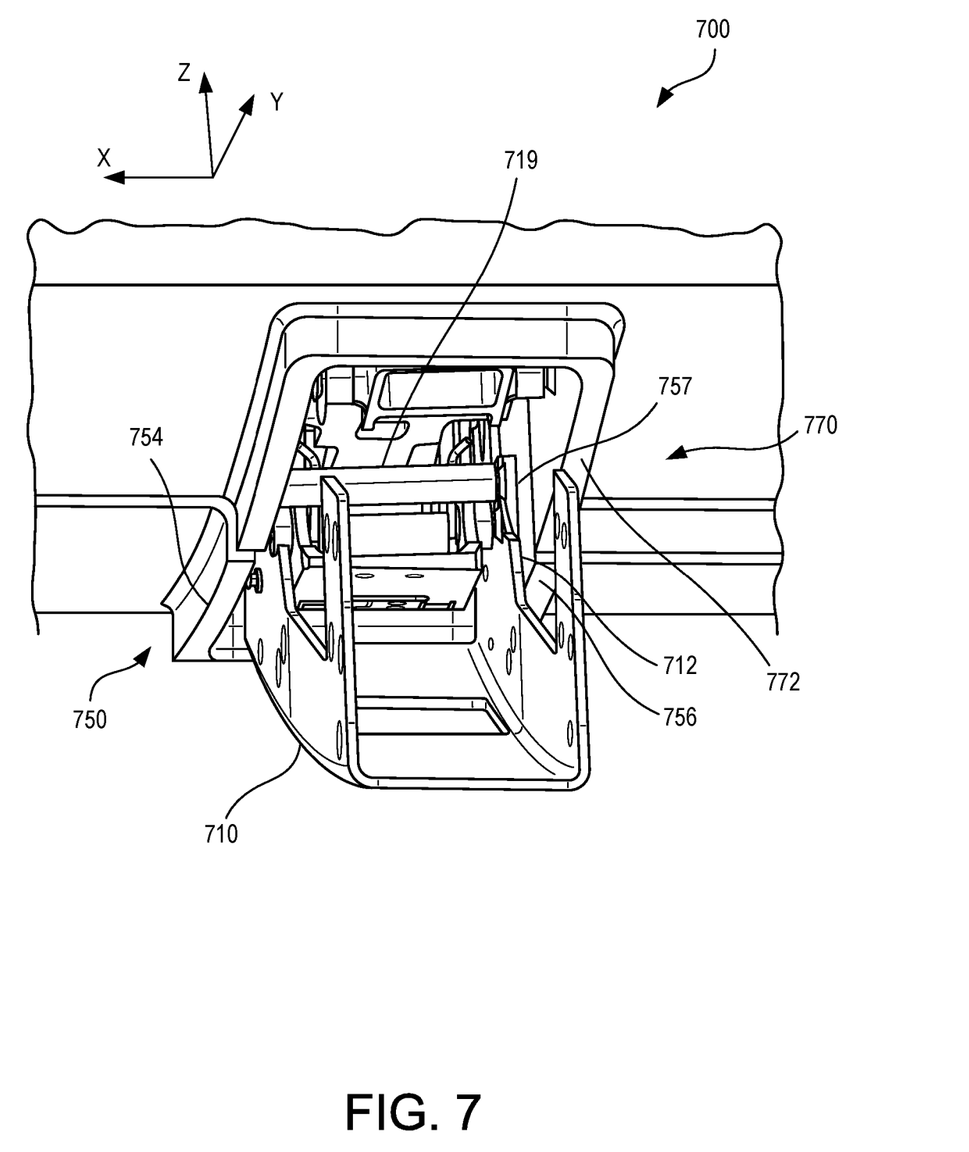
FIG. 7 illustrates a perspective view of a partially closed latch mechanism in accordance with various embodiments of the disclosure.

Referring to FIG. 7, a perspective view of a partially closed latch mechanism 700 is illustrated according to various embodiments. The latch handle 710 may pivot about a fulcrum 719. As the latch handle 710 is closed, the proximal end 712 of the latch handle 710 may contact the alignment feature 757 coupled to the aft wall 756 of the proximal half 750 of the latch housing, or the alignment feature (not shown) coupled to the forward wall 754 of the proximal half 750 of the latch housing. The contact between the alignment feature 757 and the latch handle 710 may align the latch handle 710 within the latch housing and prevent the distal end 714 of the latch handle 710 from contacting the external surface 772 of the distal half 770 of the latch housing.

Figure 8:
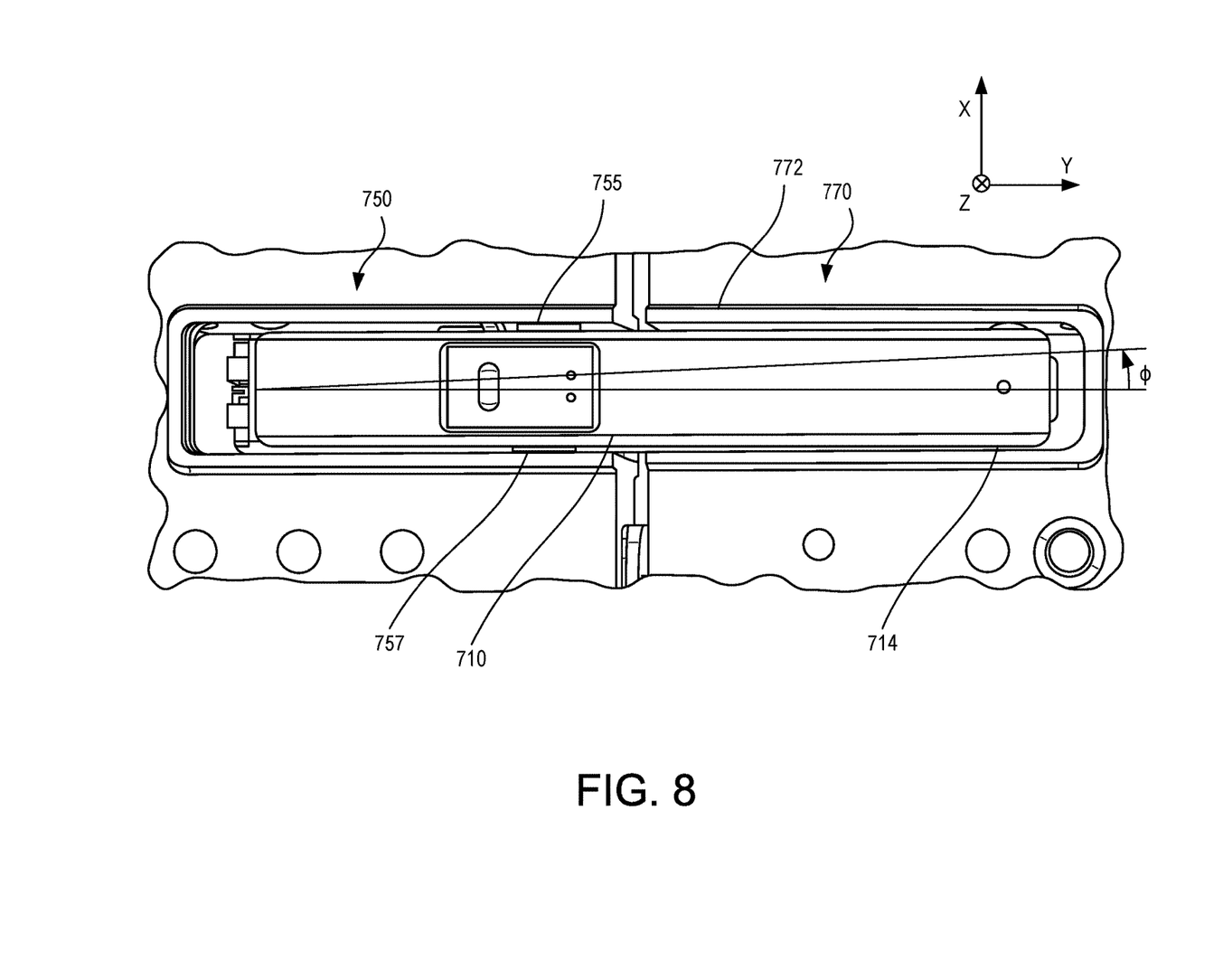
FIG. 8 illustrates a perspective view of a closed latch mechanism in accordance with various embodiments of the disclosure.

Referring to FIG. 8, a perspective view of the latch handle 710 in the closed position is illustrated according to various embodiments. As is shown, even a small angle of deflection φ can cause a significant displacement of the distal end 714 of the latch handle 710 in the forward or aft direction (positive or negative x-direction). As such, by providing alignment features 755, 757, the latch handle 710 may maintain alignment within the proximal half 750 and the distal half 770 of the latch housing as the latch handle 710 is closed.

Although described primarily with reference to an alignment feature on the latch housing, in various embodiments an alignment feature may be coupled to the latch handle 710. As the latch handle 710 moves from an unlatched position to a latched position, the alignment feature on the latch handle 710 may contact a portion of the proximal half 750 or the distal half 770 of the latch housing to align the latch handle 710 and prevent damage to the external surface 772 of the latch housing.

Figure 9:
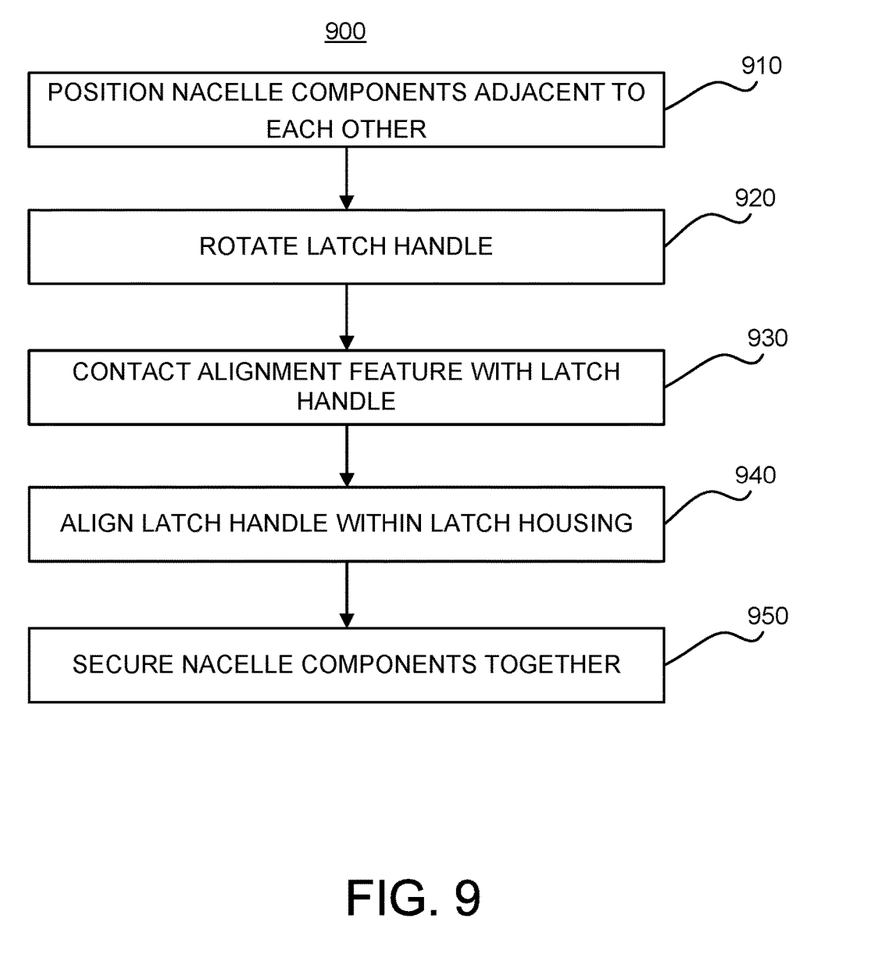
FIG. 9 illustrates a method of latching two nacelle components in accordance with various embodiments of the disclosure.

Referring to FIG. 9, a flowchart 900 of a process for latching nacelle components is illustrated according to various embodiments. A first nacelle component and a second nacelle component may be positioned adjacent to each other (step 910). For example, a left fan cowl half and a right fan cowl half may be hinged closed. A latch handle may be rotated to latch the nacelle components together (step 920). The latch handle may contact an alignment feature on a latch housing (step 930). The contact between the latch handle and the alignment feature may align the latch handle within the latch housing (step 940). The latch handle may continue to be rotated until the latch handle is located within the latch housing and the nacelle components are secured together (step 950).

Although the latching mechanism is illustrated as latching two fan cowl panels together, it could also be readily adapted as a latching mechanism which extends between an inner fixed structure (IFS) half and the engine, or between the two (left and right) IFS halves, or at any other nacelle location which utilizes latches. Additionally, although the alignment features are illustrated on the proximal half of the latch housing, in various embodiments the alignment features may be located on the distal half of the latch housing or on the latch handle.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A latch mechanism for a nacelle comprising:
   a first half of a latch housing;
   a second half of the latch housing comprising an external surface; and
   an alignment feature coupled to at least one of: the first half of the latch housing, the second half of the latch housing, or a latch handle and configured to prevent damage to the external surface from contact by the latch handle, wherein the alignment feature comprises a guide ramp.

2. The latch mechanism of claim 1, further wherein the latch handle is coupled to the first half of the latch housing.

3. The latch mechanism of claim 2, wherein the alignment feature is configured to contact the latch handle and align the latch handle within the latch housing.

4. The latch mechanism of claim 1, wherein the first half is coupled to a first fan cowl panel, and wherein the second half is coupled to a second fan cowl panel.

5. The latch mechanism of claim 1, wherein the alignment feature is integrally formed with the latch housing.

6. The latch mechanism of claim 1, wherein the guide ramp is positioned at an angle of between 10° -20° relative to a forward wall of the first half of the latch housing.

7. An aircraft nacelle comprising:
   a first nacelle component rotatable about a first hinge and a second nacelle component rotatable about a second hinge, wherein the first nacelle component and the second nacelle component are rotatable between a closed position in which the first nacelle component and the second nacelle component form an exterior of the aircraft nacelle, and an open position in which the first nacelle component and the second nacelle component are separated; and
   a latching mechanism configured to prevent the first nacelle component from separating from the second nacelle component, wherein the latching mechanism comprises:
     a latch housing comprising a forward wall and an aft wall;
     a latch handle; and
     a first alignment feature coupled to at least one of the latch housing or the latch handle, wherein the first alignment feature is configured to create contact between the forward wall and the latch handle and align the latch handle within the latch housing in response to the latch handle closing, wherein the first alignment feature comprises a guide ramp.

8. The aircraft nacelle of claim 7, further comprising a second alignment feature coupled to the aft wall.

9. The aircraft nacelle of claim 7, wherein the latch handle comprises a target extending from a distal end of the latch handle.

10. The aircraft nacelle of claim 7, wherein the guide ramp is positioned at angle of between 10° -20° relative to the forward wall.

11. The aircraft nacelle of claim 7, wherein the guide ramp is curved.

12. The aircraft nacelle of claim 7, wherein the first nacelle component comprises a first fan cowl panel, and wherein the second nacelle component comprises a second fan cowl panel.

13. The aircraft nacelle of claim 7, wherein the first alignment feature is configured to align the latch handle by contacting a radially inward surface of the latch handle.

14. A method of latching nacelle components together comprising:
   rotating a latch handle coupled to a first half of a latch housing, wherein the first half of the latch housing is coupled to a first nacelle component;
   contacting an alignment feature comprising a guide ramp; and
   using the contacting to align the latch handle within the first half of the latch housing and a second half of the latch housing.

15. The method of claim 14, wherein the contacting prevents the latch handle from contacting an external surface of the second half of the latch housing.

16. The method of claim 14, wherein the second half of the latch housing is coupled to a second nacelle component.

17. The method of claim 16, further comprising securing the first nacelle component to the second nacelle component.

18. The method of claim 14, wherein the first nacelle component comprises at least one of a fan cowl panel or a thrust reverser half.

19. The method of claim 14, wherein the guide ramp is curved.

* * * * *